(12) United States Patent
Greer et al.

(10) Patent No.: US 10,876,276 B2
(45) Date of Patent: Dec. 29, 2020

(54) MICROFABRICATED PASSIVELY AND/OR ACTIVELY COOLED APPARATUS FOR HIGHLY EFFICIENT, LOW COST ATMOSPHERIC WATER GENERATORS

(71) Applicants: CALIFORNIA INSTITUTE OF TECHNOLOGY, Pasadena, CA (US); PWIL Inc., Flintridge, CA (US)

(72) Inventors: Harold Frank Greer, Los Angeles, CA (US); Peter Capak, Pasadena, CA (US); Aria Anvar, Flintridge, CA (US)

(73) Assignees: CALIFORNIA INSTITUTE OF TECHNOLOGY, Pasadena, CA (US); PWIL INC., Flintridge, CA (US)

( * ) Notice: Subject to any disclaimer, the term of this patent is extended or adjusted under 35 U.S.C. 154(b) by 188 days.

(21) Appl. No.: 16/010,326

(22) Filed: Jun. 15, 2018

(65) Prior Publication Data

US 2018/0363277 A1 Dec. 20, 2018

Related U.S. Application Data

(60) Provisional application No. 62/544,232, filed on Aug. 11, 2017, provisional application No. 62/520,385, filed on Jun. 15, 2017.

(51) Int. Cl.
*E03B 3/28* (2006.01)
*B01D 5/00* (2006.01)
(Continued)

(52) U.S. Cl.
CPC .............. *E03B 3/28* (2013.01); *B01D 5/0006* (2013.01); *B01D 5/0021* (2013.01); *B01D 53/002* (2013.01); *B01D 53/265* (2013.01)

(58) Field of Classification Search
CPC .. B01D 5/0021; B01D 53/265; B01D 5/0006; B01D 53/002; B01D 45/12;
(Continued)

(56) References Cited

U.S. PATENT DOCUMENTS 5,394,937 A * 3/1995 Nieh ...................... F28D 7/103
165/108
5,435,155 A * 7/1995 Paradis .................. F25B 39/02
165/135

(Continued)

FOREIGN PATENT DOCUMENTS

JP   2015134306 A   7/2015
WO  2011/114084 A1  9/2011

OTHER PUBLICATIONS

Herrmann, C.F. et. al., "Conformal hydrophobic coatings prepared using atomic layer deposition seed layers and non-chlorinated hydrophobic precursors", *Journal of Micromechanics and Microengineering* 15(5), 984-992 (2005). 10 pages.
(Continued)

*Primary Examiner* — Frantz F Jules
*Assistant Examiner* — Martha Tadesse
(74) *Attorney, Agent, or Firm* — Steinfl + Bruno, LLP

(57) ABSTRACT

An atmospheric water generation system with high efficiency is based on a counter flowing heat exchanger including multiple cold channels, each cold channel surrounded by multiple hot channels. The hot and warm gases flow in opposite directions, allowing the cool dry air to contribute to cooling the warm humid air to the dew point. Thermoelectric or passive cooling of the warm humid air, and hydrophobic surfaces in a cyclone structure also contribute in increasing the efficiency of the water generation system.

16 Claims, 11 Drawing Sheets

(51) Int. Cl.
B01D 53/00 (2006.01)
B01D 53/26 (2006.01)

(58) Field of Classification Search
CPC ...... B01D 21/267; B01D 5/0027; B04C 5/20;
B04C 5/22; B04C 2009/004; B04C
2009/008; E03B 3/28; Y02A 20/109;
F28D 21/00
See application file for complete search history.

(56) References Cited

U.S. PATENT DOCUMENTS

| | | | | |
|---|---|---|---|---|
| 6,210,575 | B1* | 4/2001 | Chase | B01D 29/118 |
| | | | | 209/12.1 |
| 2011/0052369 | A1* | 3/2011 | Michaud | F03G 6/045 |
| | | | | 415/4.2 |
| 2011/0252968 | A1* | 10/2011 | Mäkinen | B01D 45/12 |
| | | | | 95/267 |
| 2012/0325343 | A1* | 12/2012 | Mayer | B01D 5/0006 |
| | | | | 137/544 |
| 2013/0047655 | A1* | 2/2013 | White | F24F 5/001 |
| | | | | 62/264 |
| 2013/0340468 | A1* | 12/2013 | Ma | F24F 3/1417 |
| | | | | 62/476 |
| 2014/0083120 | A1* | 3/2014 | Nowak | E03B 3/28 |
| | | | | 62/93 |
| 2016/0145838 | A1 | 5/2016 | Turner, Jr. et al. | |
| 2017/0198977 | A1* | 7/2017 | Herring | F28F 9/02 |
| 2017/0198978 | A1* | 7/2017 | Kuczek | F28D 7/0066 |

OTHER PUBLICATIONS

Muskin, J. et al., "Three-Dimensional Printing Using a Photoinitiated Polymer", *Journal of Chemical Education* 87(5), 512-514 (2010). 3 pages.
Yun, Y.H. et al., "Polymer Inkjet Printing: Construction of Three-Dimensional Structures at Micro-Scale by Repeated Lamination", *Macromolecular Research* 17(3), 197-202 (2009). 6 pages.
International Search Report for International Patent Application No. PCT/US2018/037898 filed Jun. 15, 2018 on behalf of California Institute of Technology et al. dated Sep. 28, 2018. 4 pages.
Written Opinion for International Application No. PCT/US2018/037898 filed Jun. 15, 2018 on behalf of California Institute of Technology et al. dated Sep. 28, 2018. 8 pages.
Boye et al. "Transectional heat transfer in thermoregulating bigeye tuna (*Thunnus obesus*)—a 2D heat flux model", Journal of Experimental Biology 212, 3708-3718, 2009.
Sabry et al. "Scale Effects on Fluid Flow and Heat Transfer in Microchannels", IEEE Transacations on Components and Packaging Technologies, vol. 23, No. 3, 562-567, Sep. 2000. 7 pages.
T. A. Schaedler, A. J. Jacobsen, A. Torrents, A. E. Sorensen, J. Lian, J. R. Greer, L. Valdevit, W. B. Carter. "Ultralight Metallic Microlattices", Science, Nov. 18, 2011; vol. 334 (6058): 962-965.
Stevens, "Design and Physiology of Arteries and Veins | The Retia", In Encyclopedia of Fish Physiology, edited by Anthony P. Farrell, Academic Press, San Diego, 2011, pp. 1119-1131.
Stevens et al. "Vascular Anatomy of the Counter-Current Heat Exchanger of Skipjack Tuna", J. Exp. Boil. 61, 145-153, 1974. 12 pages.
Wikipedia, "Atmospheric water generator", Jul. 20, 2017. 3 pages https://en.wikipedia.org/wiki/Atmospheric_water_generator.

* cited by examiner

MICROFABRICATED PASSIVELY AND/OR ACTIVELY COOLED APPARATUS FOR HIGHLY EFFICIENT, LOW COST ATMOSPHERIC WATER GENERATORS

CROSS REFERENCE TO RELATED APPLICATIONS

The present application claims priority to U.S. Provisional Patent Application No. 62/520,385, filed on Jun. 15, 2017, and U.S. Provisional Patent Application No. 62/544,232, filed on Aug. 11, 2017, the disclosures of each which are incorporated herein by reference in their entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to water generation. More particularly, it relates to a microfabricated, passively and/or actively cooled apparatus for highly efficient, low cost atmospheric water generators.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
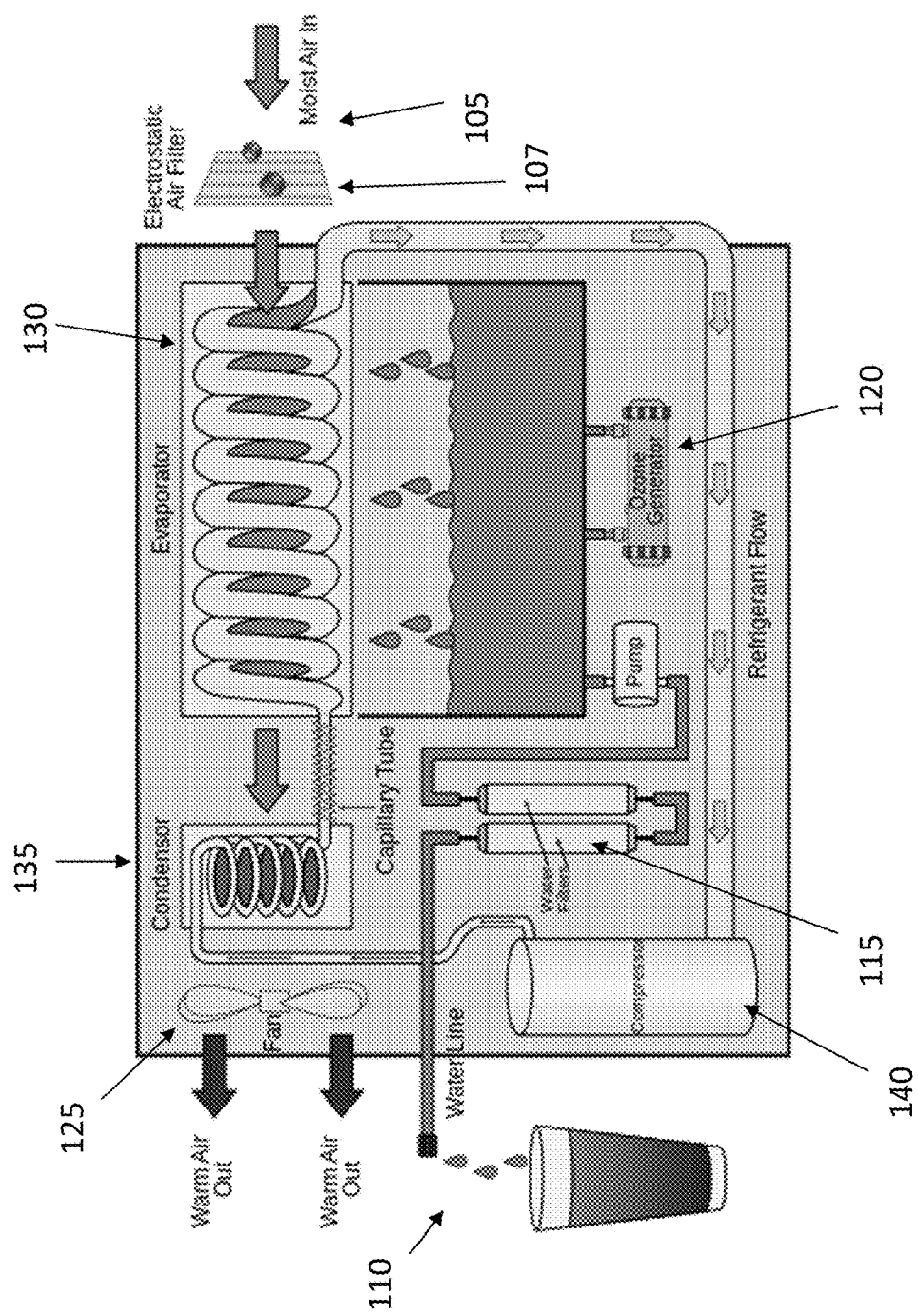
FIG. 1 illustrates a prior art AWG system.

In a first aspect of the disclosure, a structure is described, the structure comprising: a counter flowing heat exchanger comprising a plurality of cold channels and a plurality of hot channels, wherein the plurality of cold channels is configured to carry a fluid in a first direction at a first temperature, and the plurality of hot channels is configured to carry the fluid in a second direction opposite the first direction, and at a second temperature higher than the first temperature; a cooler connected to the plurality of hot channels of the counter flowing heat exchanger and configured to cool the fluid; and a cyclone structure connected to the cooler and configured to: generate a vortex in the fluid, condense water within the fluid onto surfaces of the cyclone structure, direct the fluid to the plurality of cold channels of the counter flowing heat exchanger, and collect condensed water in a reservoir.

In a second aspect of the disclosure, a method is described, the method comprising: inputting warm humid air into a plurality of hot channels within a counter flowing heat exchanger; cooling the warm humid air to its dew point; directing the cool humid air into a cyclone structure; generating a vortex in the cool humid air within the cyclone structure by inducing a circular motion in the cool humid air; condensing water onto surfaces of the cyclone structure, thus obtaining water droplets at the surfaces of the cyclone structure, and cool dry air; directing the cool dry air into a plurality of cold channels within the counter flowing heat exchanger; cooling the warm humid air within the plurality of hot channels by heat exchanging across walls between the plurality of hot channels and the plurality of cold channels; and collecting condensed water in a reservoir.

DETAILED DESCRIPTION

Access to clean drinking water is a problem in many areas of the world, from developing countries to big U.S. cities such as Flint, Mich. By 2025, the UN expects that 14% of the world's population will encounter water scarcity. The history of the Western United States has been a series of clashes over water rights. All of these issues combine to create an urgent need for a reliable source of clean drinking water that is inexpensive and requires little to no power to operate.

Atmospheric water generators (AWG) are a promising technology for resolving water scarcity issues. In fact, a significant amount of water vapor is present in the air, so an AWG can be used to collect water by cooling the air below the dew point and condensing the water into a usable form. Commercial off-the-shelf AWG systems are currently available; however, such existing systems are expensive (e.g. a commercial unit currently retails for $2000), and they use a significant amount of power (more than 1 kWh per gallon of water produced). Therefore, existing commercial AWG systems can be considered a niche product, or a technology that is unable to meet the important requirements set by current water scarcity problems.

The present disclosure is based on microfabrication technologies to reduce the cost and increase the efficiency of AWG system. Radiative heater designs developed for spacecraft can also be employed, as described in the present disclosure, to obtain significant amounts of passive cooling and consequently reduce the energy consumption of AWG systems. Therefore, in some embodiments, the AWG systems of the present disclosure can be 10× cheaper and use 10× less power than existing commercial AWG systems.

In fact, existing AWG commercial systems have several problematic issues: they can be less than 5% efficient; they have poor energy recovery from exhaust air; their high temperature differential makes their cooling inefficient; they have poor heat exchange with air. The AWG systems of the present disclosure, instead, use advanced manufacturing to: build cheap energy recovery system; improve the heat exchanger; their improved efficiency enables the use of thermoelectric and passive cooling, reducing cost and potentially further enhancing efficiency; they can use hydrophobic or super-hydrophobic surfaces to enhance nucleation, for better water recovery.

AWG systems extract water from air via cooling. The air needs to be cooled beyond the saturation point where water droplets will form, and the latent heat of condensation is released to the air. The temperature at which this occurs is called the dew point. The primary energy input required to reach this point is the temperature change multiplied by the heat capacity of the air. As known to the person of ordinary skill in the art, the heat capacity of air $C_p=1.005$ for temperatures between −20° and 40° C. An additional parameter is the heat capacity of the water in the air, which can be determined from the maximum capacity of water in the air, $M_w$ (shown in Table 1), multiplied by the relative humidity, RH. Table 1 tabulates $M_w$ in kg of water per kg of air.

TABLE 1

| Temperature [° C.] | $M_w$ |
|---|---|
| 0 | 0.003767 |
| 5 | 0.005387 |
| 10 | 0.007612 |
| 15 | 0.01062 |
| 20 | 0.014659 |
| 25 | 0.019826 |
| 30 | 0.027125 |
| 35 | 0.034424 |
| 40 | 0.041723 |

It is possible to define the temperature change required to extract water as:

$$\Delta T = T - T_d$$

where T is the ambient temperature and $T_d$ is the dew point. The energy required to reach the dew point per kg of air is then:

$$E_{Air} = \Delta T \left( C_{Air} + C_{Water} M_W \frac{RH}{100} \right)$$

where $C_{Air}$ and $C_{Water}$ are constant over normal temperature ranges and $M_w$ is a function of T, the incoming dry bulb air temperature. The energy required per kg (liter) of water can be obtained as:

$$E_{Water} = \Delta T \left( \frac{C_{Air}}{M_W} \frac{100}{RH} + C_{Water} \right)$$

The dew point can be determined given the dry bulb temperature and relative humidity via the following equations:

$$T_d = \frac{243.5\gamma}{17.61 - \gamma}$$

$$\gamma = \ln\left(\frac{RH}{100}\right) + \frac{17.61 T}{243.5 + T}$$

The energy required to extract 1 liter of water at maximal efficiency is then given in Table 2. Table 2 lists the energy required to extract water in kWh/L. The output air can be used to cool the incoming air through a gas heat exchanger. The outgoing air temperature can be determined from the latent heat of the water, which is 334 kJ/L, and the mass of the outgoing air:

$$T_{Out} = T_{Dew} + C_{Air} \frac{1}{334 M_W} \frac{100}{RH}$$

The potentially recoverable energy from an incoming/outgoing air heat exchanger can then be calculated as:

$$E_{Recoverable} = (T - T_{Out}) \frac{C_{Air}}{M_W} \frac{100}{RH}$$

Table 2 gives the energy required to extract water with no energy recovery, in kWh/L.

TABLE 2

| T {° C.) | RH = 20% | RH = 40% | RH = 60% | RH = 80% |
|---|---|---|---|---|
| 0 | 7.649 | 2.331 | 0.964 | 0.378 |
| 5 | 5.594 | 1.725 | 0.716 | 0.301 |
| 10 | 4.144 | 1.298 | 0.554 | 0.247 |
| 15 | 3.115 | 0.995 | 0.439 | 0.209 |
| 20 | 2.371 | 0.776 | 0.356 | 0.181 |
| 25 | 1.847 | 0.621 | 0.297 | 0.162 |
| 30 | 1.429 | 0.498 | 0.250 | 0.146 |
| 35 | 1.189 | 0.427 | 0.224 | 0.138 |
| 40 | 1.034 | 0.382 | 0.206 | 0.132 |

Table 3 gives the energy required to extract water assuming the energy from cool air is recovered, in kWh/L.

TABLE 3

| T {° C.) | RH = 20% | RH = 40% | RH = 60% | RH = 80% |
|---|---|---|---|---|
| 0 | 1.596 | 0.477 | 0.265 | 0.189 |
| 5 | 0.841 | 0.288 | 0.181 | 0.142 |
| 10 | 0.481 | 0.198 | 0.142 | 0.119 |
| 15 | 0.305 | 0.155 | 0.122 | 0.108 |
| 20 | 0.218 | 0.133 | 0.113 | 0.103 |
| 25 | 0.175 | 0.123 | 0.108 | 0.100 |
| 30 | 0.151 | 0.117 | 0.106 | 0.099 |
| 35 | 0.141 | 0.115 | 0.105 | 0.098 |
| 40 | 0.136 | 0.115 | 0.105 | 0.098 |

The percentage increase in efficiency with a gas heat exchanger is given in Table 4. The increase in efficiency from recovering energy from cool air is large, especially for dry conditions.

TABLE 4

| T {° C.) | RH = 20% | RH = 40% | RH = 60% | RH = 80% |
|---|---|---|---|---|
| 0 | 379% | 389% | 257% | 100% |
| 5 | 565% | 499% | 295% | 113% |
| 10 | 762% | 554% | 291% | 107% |
| 15 | 920% | 542% | 259% | 93% |
| 20 | 988% | 481% | 215% | 76% |
| 25 | 957% | 405% | 174% | 61% |
| 30 | 847% | 324% | 136% | 48% |
| 35 | 743% | 270% | 113% | 40% |
| 40 | 658% | 233% | 97% | 34% |

Table 5 gives the current efficiency of current atmospheric water generators known in the art. The efficiency for these devices is compared with the energy usage in Table 2, while the total efficiency is to be compared with that listed in Table 3. These efficiencies are calculated assuming 80% humidity and 30° C., which are the conditions quoted by the manufacturer of the atmospheric water generators of Table 5.

TABLE 5

| Ecoloblue ™ Model | Required Energy [kWh/L] | Efficiency for these devices [%] | Total Efficiency [%] |
| --- | --- | --- | --- |
| 30ME | 1.1 | 13.3 | 9.0 |
| 30 | 1.14 | 12.8 | 8.7 |
| 100 | 1.59 | 9.2 | 6.2 |
| 1000 | 1.63 | 9.0 | 6.1 |

There are several factors that can be considered to determine where the atmospheric water generators systems lose efficiency. The primary loss for current systems known in the art is in the cooling systems, which require high capacities to cool the air. Additional inefficiencies in the heat exchanger require the system to operate at higher delta-T (or differences in temperature) than the minimum values needed to purely extract water. Additionally, thermal losses to the ambient environment also decrease efficiency.

As described in the present disclosure, using a gas-gas heat exchanger can improve the potential efficiency beyond just recovering energy from the cool air. This type of heat exchanger also reduces the temperature differential at the primary heat exchanger from temperature differentials of 5-10° C. to 0.5-1.5° C. degrees. The lower temperature differential can significantly improve the efficiency of the cooling device.

The fraction of water that nucleates is another source of inefficiency that reduces the efficiency proportionally; therefore, increasing the efficacy of nucleation is another factor which can produce large gains in efficiency.

FIG. 1 illustrates a prior art AWG system. Moist air (105) is introduced into the system, where multiple components extract water (110). This type of system comprises a filter to remove air contaminants (107); filters to filtrate the water (115); an ozone generator (120); an ultraviolet (UV) light to irradiate the input air and the water; a fan to circulate air (125); a cooling system comprising an evaporator (130), a condenser (135), and a compressor (140). This system typically has an energy loss greater than 90%, based on a standard evaporator/condenser efficiency combined with lack of reuse of previously cooled air.

The present disclosure describes a system comprising an air-air microchannel heat exchanger to recover energy from previously cooled air. The heat exchanger has a bio-inspired design for maximal efficiency. The compressor-based cooling system is replaced with a thermoelectric cooling system to reduce costs. The use of a heat exchanger reduces the overall energy needs of the device, allowing for thermoelectric cooling options. In some embodiments, a passive radiative cooling system can also be used instead of the thermocouple to drive the cooling. A vortex can be used in the water condensation area, to enhance water recovery. The previously cooled air is returned to the heat exchanger, from the water condensation area, to help cool incoming warm moist air. The cooling surfaces and vortex can be rendered hydrophobic or super-hydrophobic to enhance water condensation.

In some embodiments, the systems described in the present disclosure comprise a heat changer which replicates the vessel/micro channel patterns as found in the heat exchanging tissue (retia) of Pacific Bluefin tuna, which are at least 90-95% efficient. In some embodiments, the basic unit structure of the heat exchanger of AWG systems as described herein is a single channel 80-100 μm in diameter (or distance between opposite edges of the geometrical shape) containing warm gas, surrounded by several (e.g. 4 to 6) 80-100 μm channels containing cooler gas flowing in the opposite direction as part of a heat exchanging mechanism. For example, if the gas is air, the cooler air would have a lower temperature than the warm air, allowing heat exchange between air at different temperatures. In some embodiments, the channels can be hexagonal in shape. The overall number of channels per device can be in the thousands. The overall length of the device can be approximately 10-20 cm, in some embodiments. The AWG system can also be modular in design and can be organized in series or parallel depending on the application.

Figure 2:
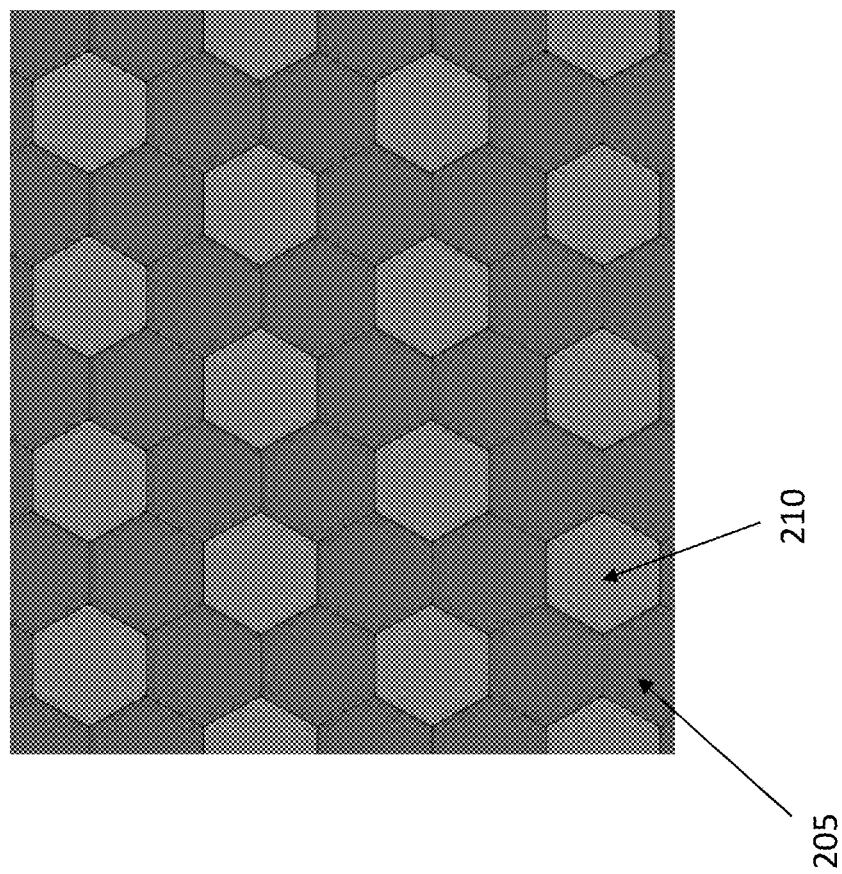
FIG. 2 illustrates one embodiment of a cellular counter-flow micro-channel heat exchanger.

FIG. 2 illustrates one embodiment of a cellular counter-flow micro-channel heat exchanger, where warm gas flows through the channels (210) and cold gas flows through the channels (205), allowing heat exchange between the gases at different temperatures. In some embodiments, the configuration of the channels may be reversed, with warm gas flowing in channels (205) around each cold gas channel (210). FIG. 2 is a cross section normal to the longitudinal axis of the channels. In some embodiments, the lateral dimension of the microchannels, measured edge to edge, is about 80-100 μm. In some embodiments, the hot channels are larger than the cold channels, therefore the relative dimensions can be adjusted accordingly. In some embodiments, the flow is laminar, requiring a temperature range between 0° C. and 50° C. The hexagonal channels of FIG. 2 maximize the surface area on which the heat exchange takes place. However, other shapes may be used for the channels, depending on the application. In some embodiments, the arrangement of the channels is such that there is a 6:1 ratio of cold to warm channels at the cold end of the heat exchanger, and a 6:1 ratio of warm to cold channels at the warm end of the heat exchanger. This ratio can change across the heat exchanger depending on application. Generally, the direction of gas flow in the warm and cold channels is opposite to each other.

Figure 3:
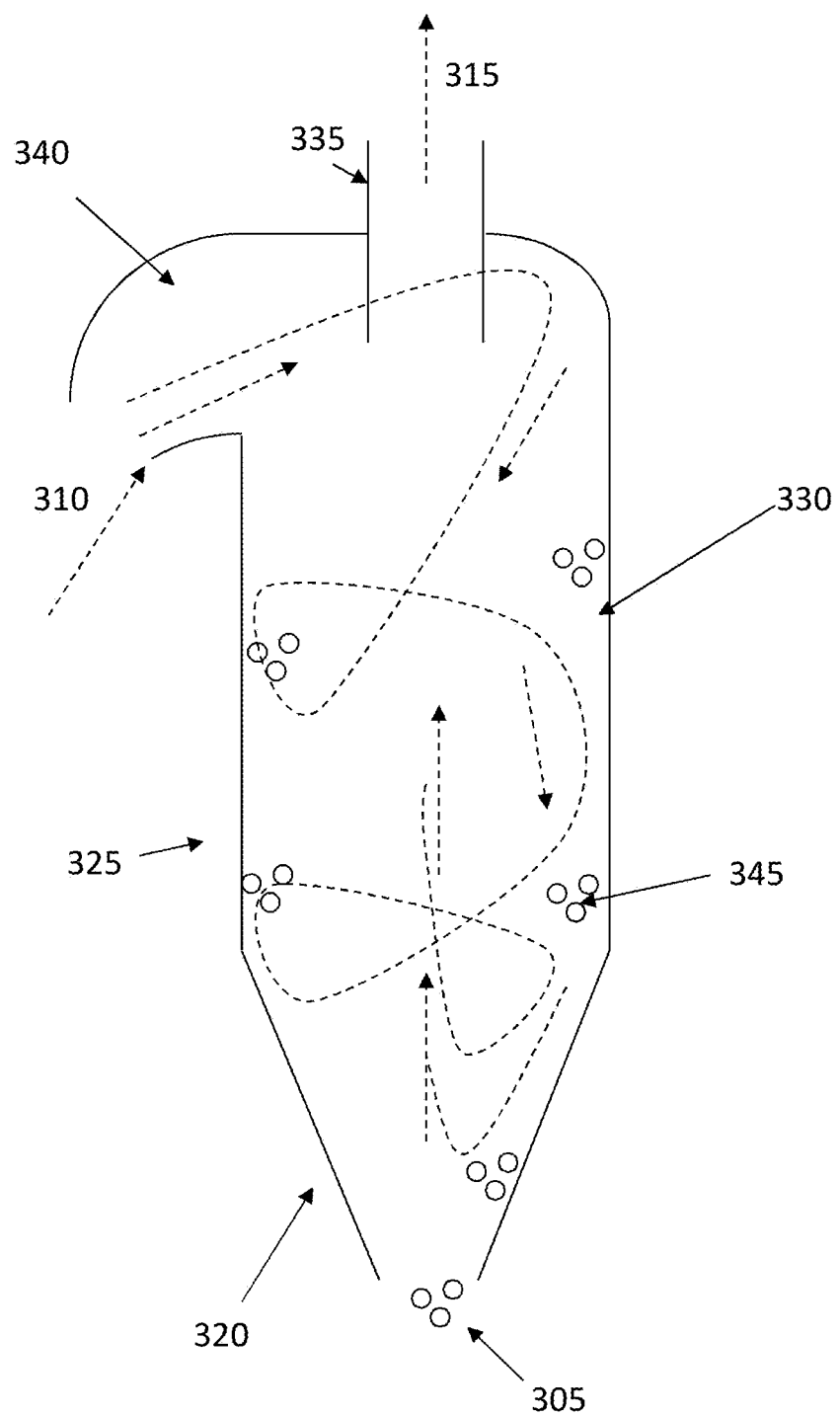
FIG. 3 illustrates how the formation of a vortex for the humid air facilitates condensation and increases the efficiency of the device.

FIG. 3 illustrates how the formation of a vortex for the humid air facilitates condensation and increases the efficiency of the device. In some embodiments, the inner surface of the conic structure of FIG. 3 is rendered hydrophobic or super-hydrophobic, for example with coatings, embossing processes to form appropriate micro textures or nanotextures, etching, deposition of nanoparticles or microparticles, or combinations thereof. The super-hydrophobicity can facilitate condensation of water and increase the efficiency of the device. In FIG. 3, incoming humid cool air (310) enters the conic structure at the inlet (340). The gas, or air, acquires a vortex flow pattern induced by the shape of the conic structure, or cyclone body (325). The conic structure has a cylindrical shape (325), and a conical section (320). The interior surface can be hydrophobic super-hydrophobic (330). The water, after condensation (345), is ready for collection (305). Once the water in the air condenses at the surface of the cylindrical and conical sections, the air rises up within the central, axial portion of the device, exiting as cool dry air (315) through the outlet tube (335). In addition, the angle and macro-roughness or surface patterns of the conic structure can be further optimized to alter the air fluid flow dynamics, for example generating laminar to turbulent transitions or vice versa. These conic structure sidewall angles and surface roughness or patterns can be simultaneously optimized to encourage droplet surface dynamics such as flow and shedding. In FIG. 3, the dashed lines and arrow illustrate the flow of air, which curves inside the structure as it is imparted a circular motion which follows the inner surfaces of the cyclone, creating a vortex which maximizes contact of the cool humid air with the inner surfaces where water condenses. The air flow subsequently continues by moving upward in the central portion of the cyclone, exiting as cool dry air from the top of the structure.

It can be noted that the AWG systems of the present disclosure are made possible by recent advances in three-dimensional (3D) manufacturing. For example, polymer powders can be sintered to create complex architectures. Other types of additive manufacturing methods, such as 3D printing, can also be exploited to fabricate microchannels heater exchangers as described in the present disclosure. Therefore, in some embodiments, the high efficiency devices of the present disclosure are made possible by the heat exchanger design, inspired by biological tissue, which has a very high efficiency, combined with the formation of a vortex, induced by the shape of the condensation section, as well as the use of super-hydrophobic surfaces and recent 3D manufacturing techniques.

Modern additive manufacturing can reproduce the tuna fish organ for a range of heat exchanger applications. Additive manufacturing can comprise, for example, 3D printing (inkjet printing is described for example in Ref [1]), photo-initiated polymers where materials are printed in 2D sections and stitched together (Ref [2]), or direct synthesis of an entire structure such as the self-propagating wave guide method (Ref [3]). The direct synthesis or photo-initiated polymer methods can have higher fabrication throughput compared to other methods, because larger subsections of the device, or even the entirety of the device, can be fabricated at once. By contrast, other methods such as 3D printing may involve fabricating the devices by coalescing ink droplets, one small channel sidewall at a time.

The use of these techniques significantly reduces the cost of manufacturing, rendering it practical to mass-produce heat exchangers as described in the present disclosure, and therefore extract water in an economically efficient way. While the heat exchangers described in the present disclosure are primarily designed to recover water from the atmosphere, in other embodiments, such heat exchangers can be applied to a broad range of applications such as heat-recovery in airplane cabins, industrial processes, refrigeration, domestic air conditioning systems, or uses in space.

The AWG systems of the present disclosure can comprise the following enhancements compared to atmospheric water generators known in the art: The addition of a bio-inspired air-air heat exchanger that recovers the energy from cold air generated in the process of extracting water from the air; The addition of a hydrophobic vortex extractor which enhances the efficiency of water extraction; The addition of an active air flow control system that optimizes the energy efficiency and allows for maximum water extraction; The use of impedance pumps in the heat exchanger micro-channels that allows the use of the heat exchanger to pump air; The potential use of a water jet pump to move air through the system and recover energy from the cooled water: The use of engineered surfaces to enable passively cooled elements to minimize power consumption.

Additionally, the AWGs of the present disclosure may also comprise the following elements: The use of thermo-electric cooling which reduces the system's complexity and cost. The use of air filters to remove particulate materials from the incoming air; The use of UV light to kill biological entities (such as bacteria) by irradiating incoming air; The use of a filter system to further clean the water generated; The use of a mineral additive insert to adjust the taste of the generated water. In some embodiments, other cooling methods (other than thermoelectric) may be used, for higher water generation capacity devices.

Figure 4:
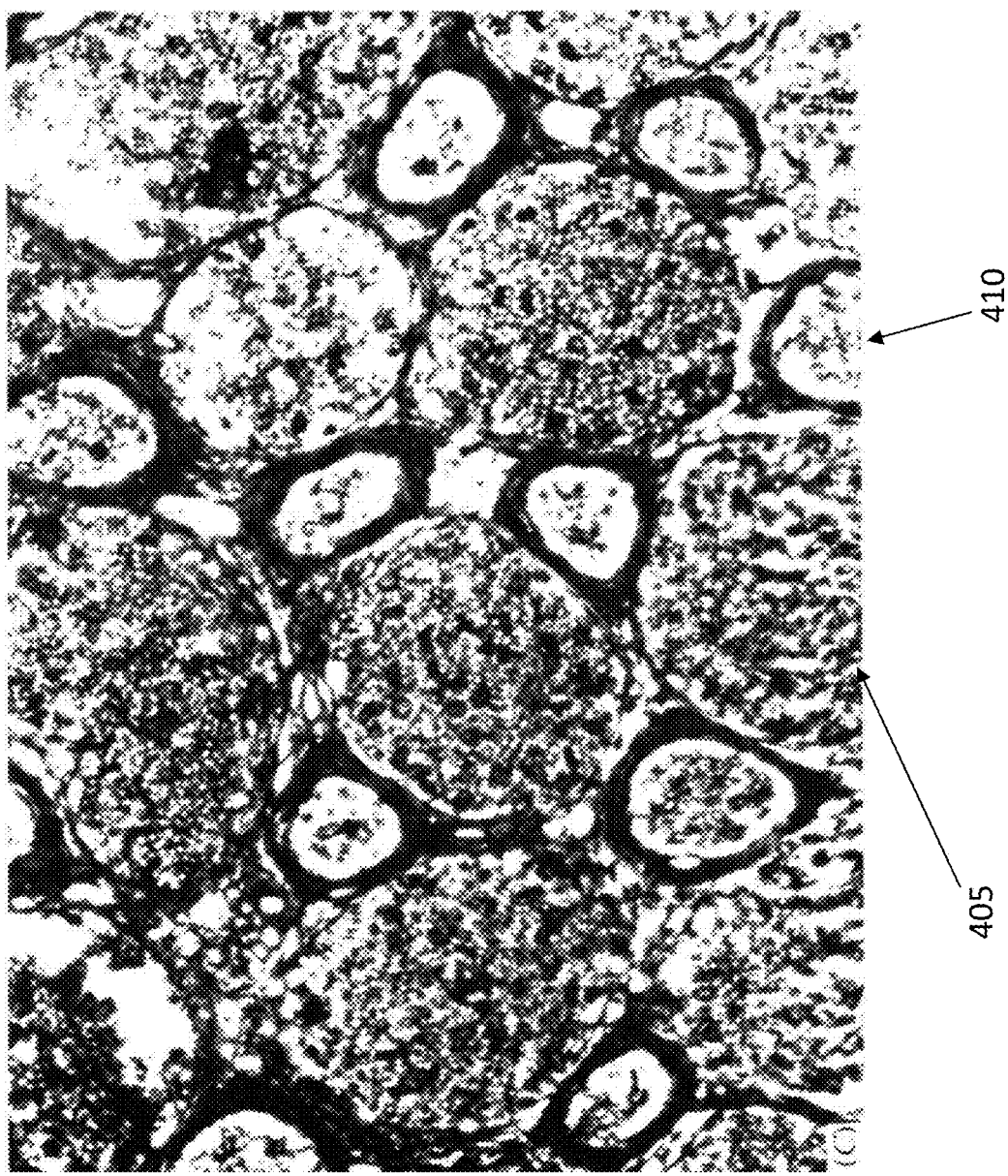
FIG. 4 illustrates a tuna organ.

The design of the heat exchangers of the present disclosure is inspired by the counter-current heat exchanger organ, the 'rete' (FIG. 4), that has evolved in tuna fish (Ref [4]). This organ developed to allow the cold-blooded tuna to maintain and control body temperature gradients and adjust for water temperature differentials. The organ is up to 99% efficient at recovering heat generated in muscles and tissue (Ref [5]). FIG. 4 illustrates a cross section of the tuna 'retes' organ from Ref [4] that inspired the heat exchanger design. The large vessels (405) in FIG. 4 are the venules carrying hot blood, while the small vessels (410) are the arterials carrying cold blood.

Vascular rete (plural 'retia') refers to the organs found primarily in fish (tuna, some billfishes, and certain sharks species) that consist of a collection of vascular tubules (arterioles, venules) arranged in parallel. The retia operate under the principle of counter-current heat exchange, and permit these fish to recover metabolic heat and therefore achieve and maintain body temperatures much greater than the ambient water temperature. For example, the muscle temperatures of large blue fin tuna can be as much as 15-20 degrees Celsius above ambient temperature (Refs. [6-7]). There are no known endocrine or neurological contributors to the thermoregulatory mechanics. Energy conservation therefore consists primarily of harvesting heat via conduction gradients between the afferent arterioles and efferent venules.

Heat loss in most fish occurs primarily at the gills, where metabolic heat in the veins is efficiently transferred to the surrounding water. Retia act as a thermal barrier between venous blood and the gills. Cold, oxygen-rich arterial blood from the gills on its way to the tissues passes through the retia, where it is surrounded and heated by the warm, oxygen poor, venous blood on its way to the gills. In tuna, the retia are estimated to operate at 95-99% efficiency with respect to energy recovery. The key factors that affect the effectiveness of heat exchange within the retia are flow rate in the vessels, the distance between the vessels, and the surface area of contact available for energy exchange.

The fish control the temperature of the blood by controlling the flow rate through the system and shunting blood into a bypass system to reduce or increase the efficiency of the heat exchanger. The tuna 'retia' have several key features that enhances the efficiency of the heat exchange.

A number of embodiments of the disclosure have been described. Nevertheless, it will be understood that various modifications may be made without departing from the spirit and scope of the present disclosure. Accordingly, other embodiments are within the scope of the following claims. These are listed in the following.

The core of the 'retia' contains microchannels where both the hot and cold fluid is in laminar flow. This maximizes the rate of heat exchange between the two fluids. In the tuna fish typical diameters of the cold (arteriole) vessels are 35.7±1.3 µm and the hot (venule) vessels are 83.8±4.5 µm. The hot and cold fluids travel in opposite directions, creating a counter-current heat-exchanger. The rate of flow through the heat exchanger is modulated by conditions to ensure maximum efficiency. The typical flow velocity through the system is 0.03 cm/s. The diameter of the cold to hot vessels is a 1 to 2.3 ratio with the hot vessels being larger. Therefore, the contact-surface area of the hot vessels is also 2.3 times that of the cold vessels, while the cross-sectional area of the hot vessels is 5.3 times that of the cold vessels. The geometric arrangement of the vessels is such that the cold vessels are completely surrounded by the hot vessels. The thickness of the vessel walls is typically as thin as possible while maintaining structural integrity. The typical vessel wall thickness is 7±1 μm in fish. The material of the vessel walls has a thermal conductivity similar to that of the fluid for which heat is being exchanged. For blood, this is similar to water which is 0.520-0.68 W m$^{-1}$ K$^{-1}$. For air it would be 0.02-0.03 W m$^{-1}$ K$^{-1}$. It can be noted that the value of thermal conductivity for the case of air is close to that of typical low-density polymers. Therefore, these polymers may be used or substrates with coatings made from these polymers, in some embodiments, to fabricate the microchannels of the heat exchanger, and increase the efficiency of heat transfer across the walls of the microchannels.

An important aspect of the AWG system described in the present disclosure is the relative geometry and placement of the channels. The geometry of the channels can be scaled to be optimized for different fluids. The notional values for dimensions and vessels above are for blood which can be approximated as water. For other fluids, the requirement to maintain laminar flow to retain efficiency can drive the material parameters. To maintain laminar flow, the Reynolds number should be maintained below the critical value for laminar flow which is typically 1,800-2,100. The Reynolds number depends on the fluid viscosity, flow velocity and channel size. In practice, several non-linear effects can also come into play (Ref [8]). The roughness of the channel walls also has an impact on the Reynolds number, with a surface roughness of 0.5-1% increasing the Reynolds number by 15-30%. Therefore, high surface accuracies are advantageous. Additionally, very small microchannels, typically below 1000 μm in size, start to be affected by molecular forces, reducing the critical Reynolds number to values below 500 for 40 μm channels.

The total heat exchange capacity of the system is proportional to the dimensions of the system, the thermal conductivity of the fluids, and the internal surface area of the exchanger. In a tuna fish of 1.9 kg, the heat exchanging part of the organ is typically 5 cm in length with a total volume of 7.2 cm$^3$. The organ can maintain a 9° C. temperature differential, which implies a heat exchange capacity of 1.5 W for water flowing at 0.03 cm s$^{-1}$ with a thermal conductivity of 0.6 Wm$^{-1}$K$^{-1}$. In some embodiments of AWGs according to the present disclosure, a heat transfer capacity of 66 W is required to produce 4 liters of water per day from air, at 20° C. and 50% humidity, with a thermal conductivity of 0.6 Wm$^{-1}$K$^{-1}$. Therefore, an exemplary device can have a volume of 7300 cm$^3$, which can be approximated as a cube having a side of 20 cm with a flow rate of 0.5 cm/s through the system.

Figure 5:
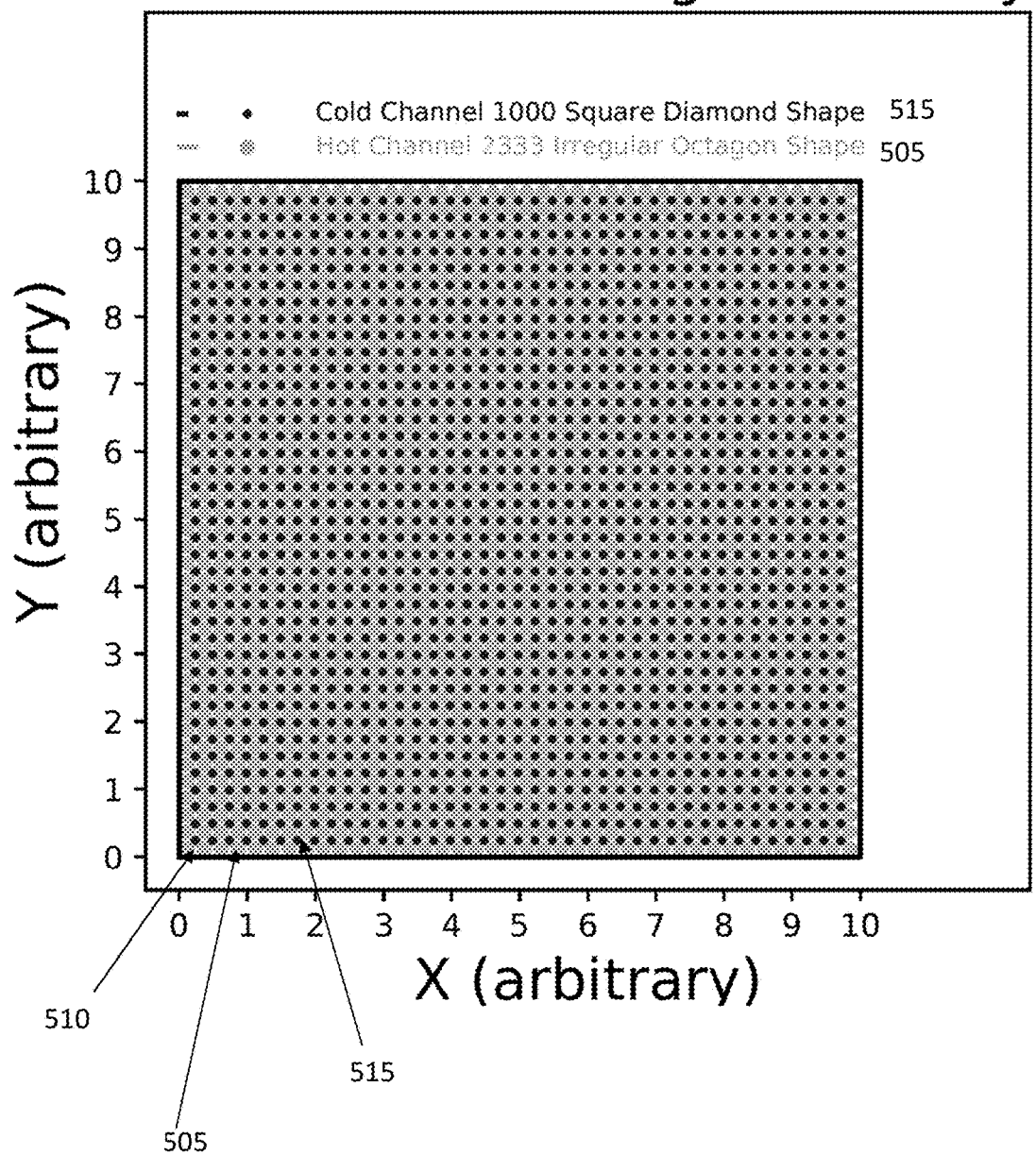
FIG. 5 illustrates an exemplary heat exchanger core.

FIG. 5 illustrates an exemplary design for a heat exchanger, comprising multiple channels for warm and cold gases. For example, the heat exchanger of FIG. 5 comprises 1,521 cold channels (515) having a diamond shape, each cold channel surrounded by four warm channels (505) having an irregular octagon shape. The hot channels are shared between adjacent cold channels. In this example, there are 1,600 hot channels. The ratio of cross sectional area between the hot and cold channels is the 1:5.3 ratio found in Tuna fish. FIG. 5 also illustrates walls (505) separating the hot channels. FIG. 5 notes that the lateral dimensions are arbitrary, in the sense that the same design can be scaled for different applications. In some embodiments, the ratio may be between 5 and 5.6 instead of exactly 5.3.

In some embodiments, as in FIG. 5, which illustrates a visual layout of the heat exchanger core geometry, the lateral dimensions of the channels have a 1:2.3 ratio for the dimensions of the cold to hot channels. The lateral dimensions of the channels are intended as the distance between opposite sides of the geometrical shape of a single channel. The geometric arrangement is such that the hot channels completely surround the cold, and the thickness of the walls is less than 5% of the thickness of the cold vessels.

The features found in the heater exchange tissue of tuna can be reproduced in the AWGs of the present disclosure with advanced additive manufacturing. In some embodiments, the properties required to reproduce the efficiency found in the tuna fish are described in the following. The material used to manufacture the heat exchanger is thermally matched to the fluid being exchanged. If the fluid used for heat exchange is air, low-density polymers with thermal conductivity of 0.2-0.02 Wm$^{-1}$K$^{-1}$ are close to optimal. However, other materials could be used for other fluids, or even for air. The surface accuracy of the micro-channels is better than 0.5-1% of the channel diameter to ensure laminar flow in the micro-channels.

Figure 6:
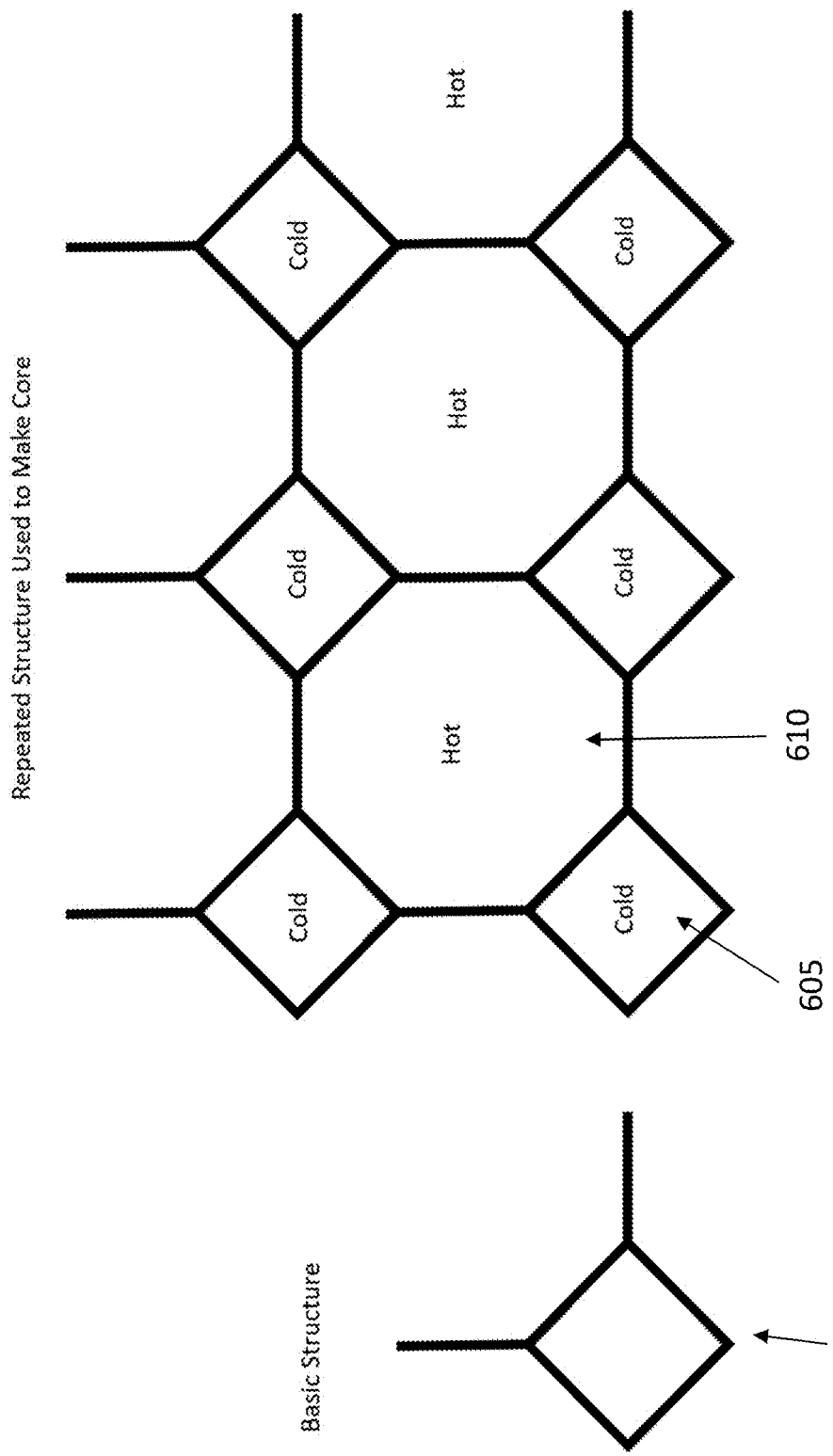
FIG. 6 illustrates an exemplary arrangement for hot and cold microchannels.

A scalable regular geometry for the heat exchanger core simplifies the process of designing and manufacturing the device. FIG. 6 illustrates an exemplary arrangement for the hot (610) and cold (605) microchannels of FIG. 5. The core can be considered as a repeated arrangement of a unit cell (615). In this exemplary arrangement, the cold channel has a diamond shape. Adding two walls to the diamond shape as in (615) creates a repeatable structure that can be used to form an arbitrarily large heat exchanger core. This core can be designed, scaled, and manufactured. The length of the sides of the cold channel and the length of the two walls determine the relative ratio of the hot and cold channels. In some embodiments, the effective cross-sectional area ratio is 1 to 5.3 which approximates the 1:2.3 ratio in lateral dimensions found in the tuna 'retes'.

In some embodiments, as described in the following, cavities are introduced at the ends of the heat exchanger to enable separation of the hot and cold fluid. Inputs are also present at the ends of the heat exchanger for intake of the cold fluid.

Figure 7:
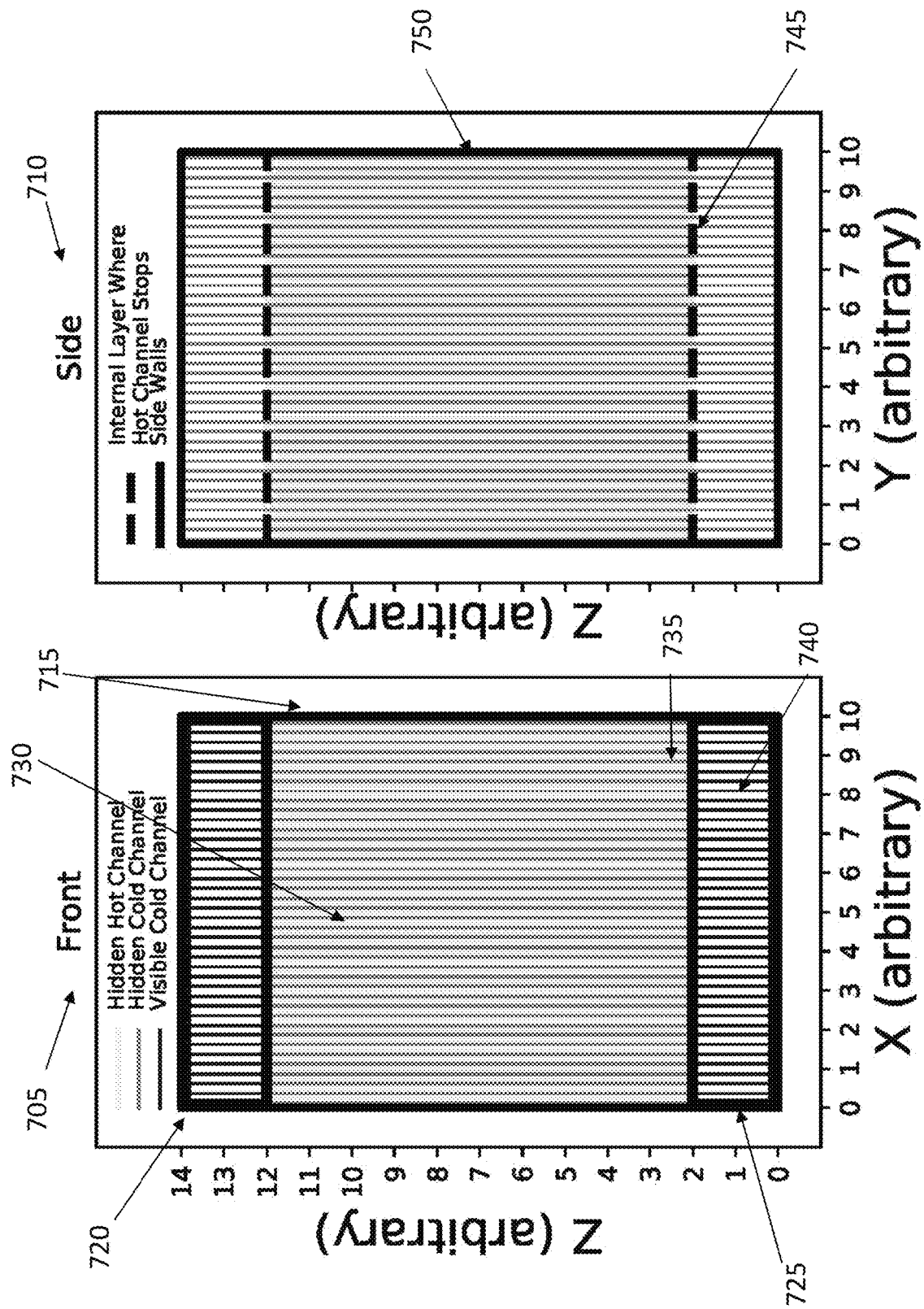
FIG. 7 illustrates an exemplary design of the core of a heat exchanger.

FIG. 7 illustrates an exemplary design of the core of a heat exchanger, with a front view cross-section (705) and a side view cross-section (710). The central part of the heat exchanger contains the core of microchannels (715), while an upper and bottom portions have cavities (720,725) that allow the warm fluid to escape the core, while the cold channels extend to the top and bottom surfaces of the exchanger. The open cavities (720, 725) allow the fluid to circulate into and out of the heat exchanger by passing around the cold channels, which are smaller and have gaps between them due to the channel geometry. In some embodiment, the cold channels in the sinus cavity can be flared outward in a conical shape to further increase the flow.

In the front view (705), the warm channels (730) and the cold channels (735) are hidden from view, as they are within the core of the exchanger. The cold channels (740) are a continuation of the hidden cold channels (735), and are now visible because of the cavities (720, 725). The side view (710) illustrates the lines (745) at which the cavities start and the warm channels stop, and the side walls (750).

Figure 8:
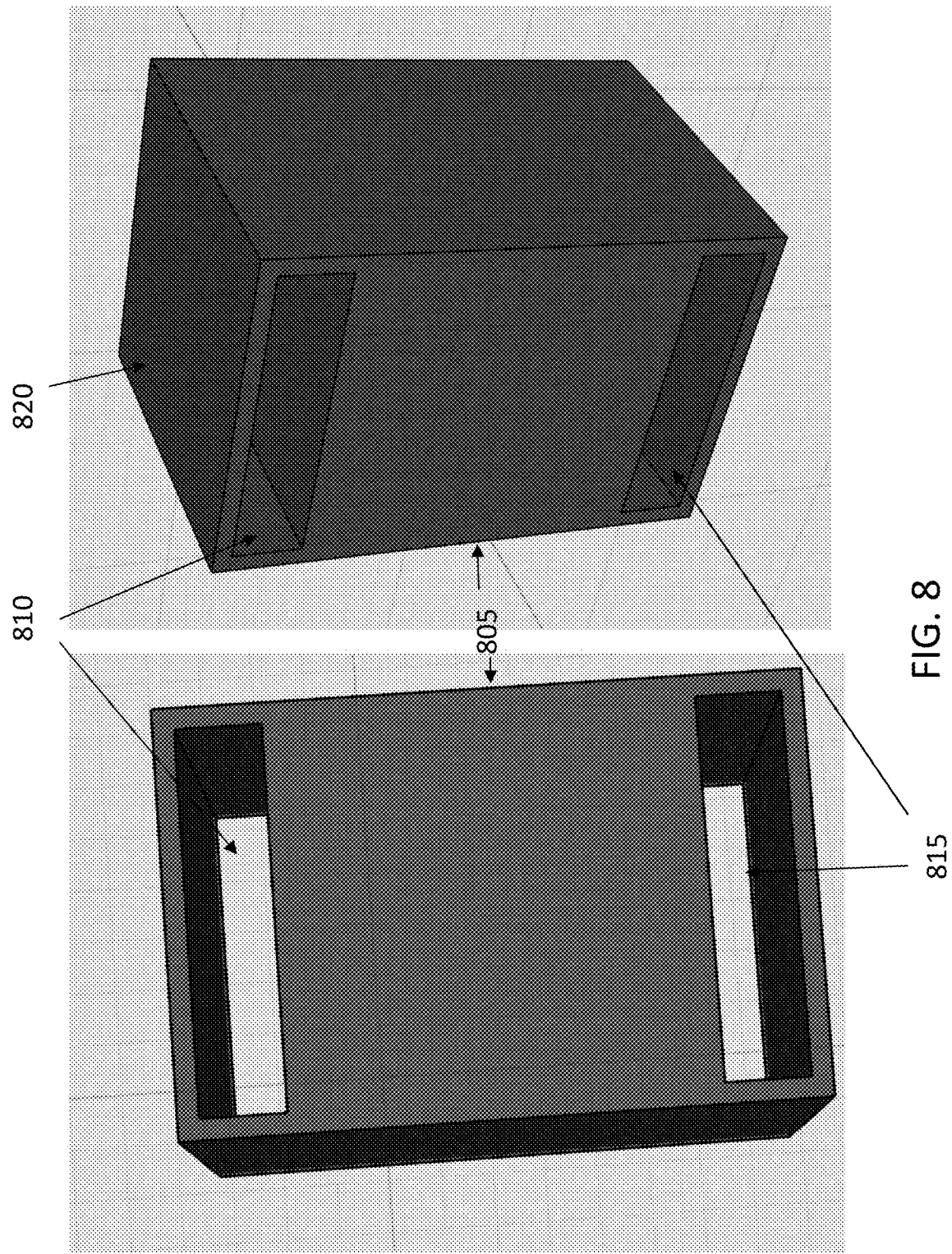
FIG. 8 illustrates an external view of structural shell of the heat exchanger.

FIG. 8 illustrates an external view of structural shell of the heat exchanger, showing the core section discussed in FIG. 7 (805), as well as the two cavities (810, 815). The cold channels, which would be visible in cavities (810, 815), are not shown in FIG. 8. The cold microchannel run through the empty cavities (810, 815), exiting at the two ends of the device such as in (820). The walls between the cold channels that create the hot channels in the core of the heat exchanger are omitted in the cavities, thus allowing fluid to move freely. This enables hot fluid to enter and exit the hot channels though the sides of the device, where it is separated from the cold fluid which enters and exits through the top and bottom of the device.

Figure 9:
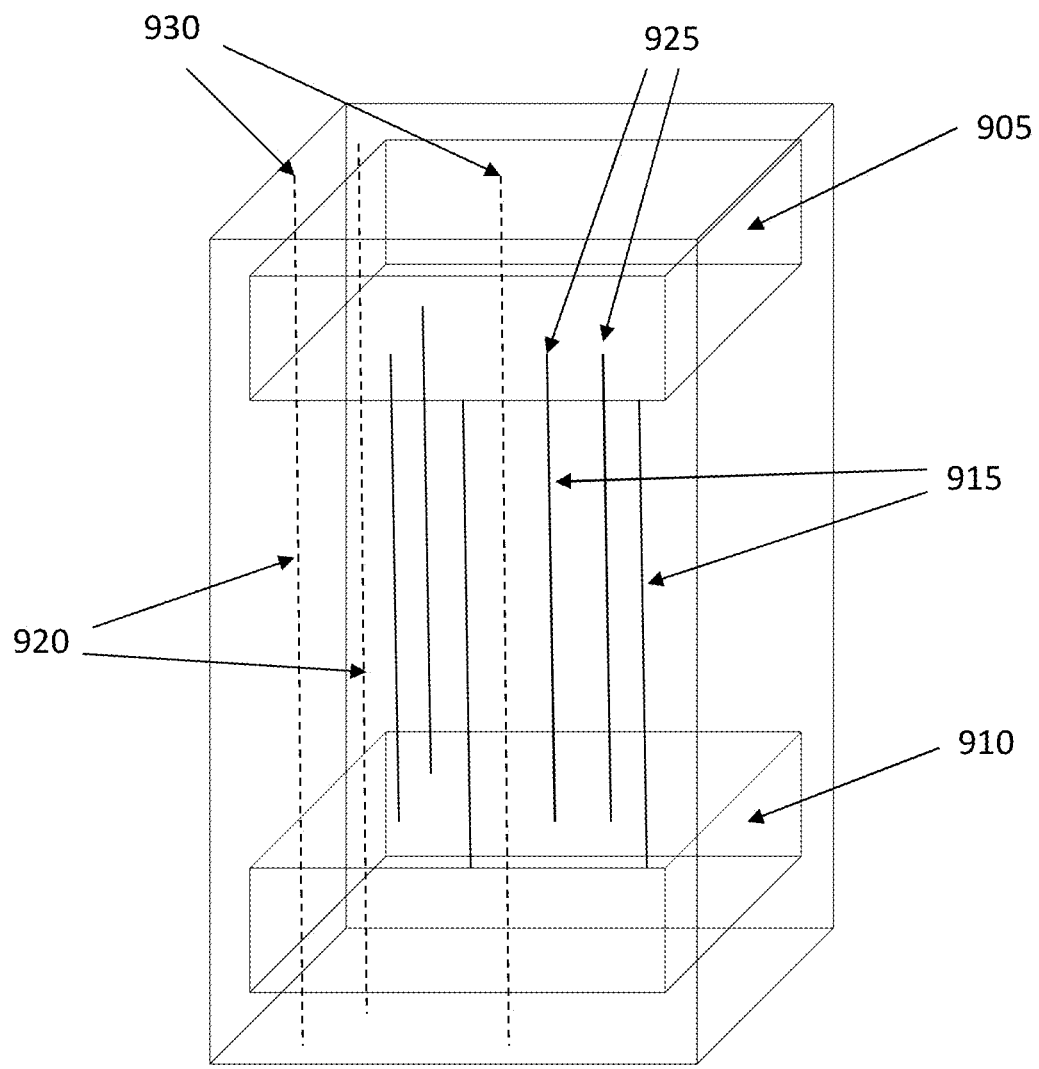
FIG. 9 illustrates an exemplary heat exchanger with some visible microchannels.

FIG. 9 illustrates a schematic view of the heat exchanger, with a top cavity (905) and a bottom cavity (910). The warm channels (915) run along the length of the core, exiting at the top and bottom cavities, such as openings (925). The cold channels (920) run along the entire length of the heat exchanger, do not open at the two cavities, and exit at the top and bottom surfaces, such as openings (930). In some example, the cold fluid may run within the cold channels from the bottom to the top of the heat exchanger, while the warm fluid runs in the opposite direction from the top cavity to the bottom cavity. In some embodiment, the directions may also be exchanged, preserving the counter flow of the warm and cold fluids. The channels in FIG. 9 are schematically illustrated. In some embodiments, the channels may have a cylindrical or square cross section, or other geometrical shapes such as, for example, the octagon and diamond shapes of FIG. 6.

Cyclone cones and condensers are widely used in industrial processes to enhance separation of two phase fluids. In the AWGs of the present disclosure, the cold air, which has been cooled below the dew point, flows through a cyclone to enhance the efficiency of the atmospheric water generator. Air is injected into the cyclone cone at the top, wide end tangential to the circular wall of the cone. In some embodiments this could be on both or only one side of the top of the cyclone. The tangential motion of the air induces circular motion around the cyclone creating centrifugal forces which cause heavier fluids and/or particles to separate outward towards the walls of the cyclone. In some embodiments where air has been cooled bellow the dew-point forming mist, the mist and water droplets are forced to the sides of the cyclone where they contact the cyclone walls and condense. The tapered sides of the cyclone walls cause the circular motion to accelerate as the air moves downward in the cone, increasing the centrifugal force and separation efficiency. Bellow the bottom end of the cone is a reservoir for water collection. A tube runs from the cold channel entrance to below the bottom of the cyclone cone. This allows the cold dry air to flow into the heat exchanger cold channels without mixing with either the cold moist air or the hot air. The outer surface of the cyclone cone can also be rendered hydrophobic or super-hydrophobic, thus enhancing droplet formation and further increasing the efficiency of the device by ensuring maximal condensation of water vapor.

The surface of the cyclone cone could be made hydrophobic using different methods, such as through coating with a material such as fluoropolymer, e.g. Teflon™, which can be dip coated, spin coated, spray coated or vapor deposited. Other materials may be used, such as paralyene, which can be vapor deposited, or by texturing the surface by etching, which may or may not use a nano-particle mask. In addition, methods such as embossing can be used to provide these textures, and multiple length scales could be appropriate.

In other embodiments, various seed layers such as $Al_2O_3$ films deposited by atomic layer deposition (ALD) can be particularly useful because the $Al_2O_3$ ALD surface chemistry is very favorable and amenable to growth on a wide variety of substrates. $Al_2O_3$ ALD can be utilized to deposit robust and reliable hydrophobic coatings. A thin $Al_2O_3$ ALD film can be deposited and used as a seed layer to prepare and optimize the cyclone surface for the subsequent attachment of the hydrophobic precursors. Once the $Al_2O_3$-coated surface is prepared, non-chlorinated alkylsilanes are chemically bonded to the surface hydroxyl groups on the ALD seed layer. This deposition technique results in a dense and conformal hydrophobic film with a water contact angle of $108\pm2°$ (Ref [9]). This concept can be extended to a wide variety of seed layers and hydrophobic bonded chain layers, such as self-assembled monolayers, etc.

Figure 10:
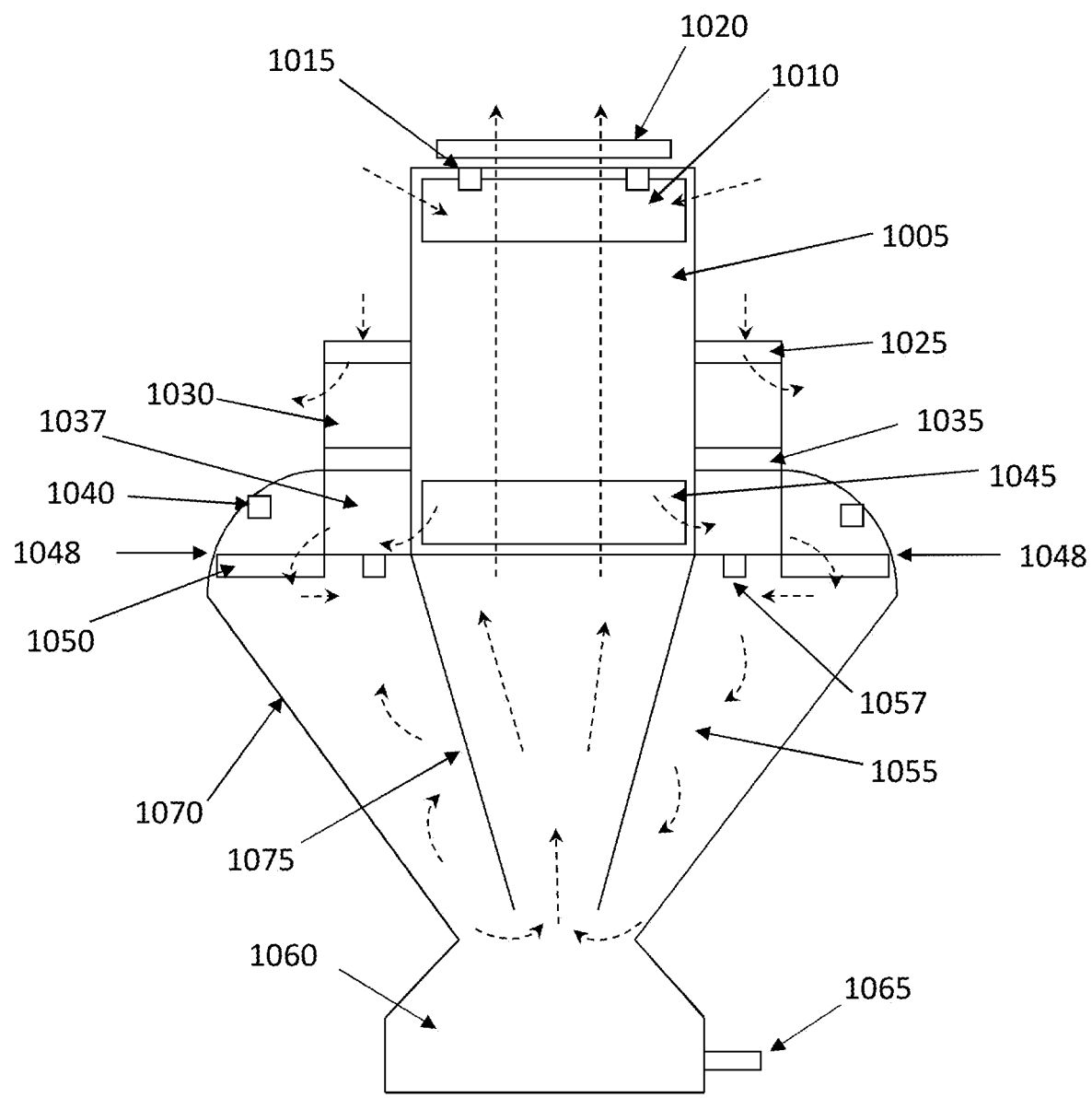
FIGS. 10-11 illustrate an exemplary AWG system according to the present disclosure.

FIG. 10 illustrates an exemplary AWG system according to the present disclosure. In FIG. 10, the flow direction of air is illustrated with dashed arrows. The top cavity (1010) of the heat exchanger (1005) acts as an intake for warm air. The heat exchanger in FIG. 10 comprises counter flowing warm and cold channels as described in FIGS. 5-10. The warm air travels down the hot air channels (the hot channels surrounding each of the cold channels), and exits the cavity (1045). On the external surface of the heat exchanger there are fans (1025) directing air through an upper, warmer heatsink (1030), which is attached to a thermoelectric cooler (1035). A cold heatsink (1037) is attached on the opposite side of the cooler (1035). More than one cooler, with attached heatsinks and fan, may be located outside the heat exchanger. The heatsink can comprise multiple metallic blades or flat surfaces, allowing flow of air through the blades. For example, structures similar to computer heatsinks could be used. The cold heatsink (1037) will have a cooler temperature than the warm heatsink (1030). The thermoelectric cooler can transfer heat from the cold heatsink to the warm heatsink. The fan on the warm heatsink flows air to disperse heat away from the warm heatsink. In some embodiments, the thermoelectric cooler and hot heatsink could be replaced with a radiative cooler to provide cooling to the cold heat-sink.

Additional fans (1050) direct the air flowing through the cold heatsinks (1037) into the conical structure below the heat exchanger. In some embodiments, the conical structure, truncated cone, or cyclone cone, can comprise an outer truncated cone structure (1070), and an inner truncated cone structure (1075). Air exiting the fans (1050) forms a vortex (as shown by the dashed arrows) which flows around the inner truncated cone structure. The vortex increases the efficiency of the water generation. The inner surface of the outer conical structure and the outer surface of the inner conical structure can be hydrophobic to enhance water condensation. The water droplets at these surfaces will slide down and collect in the reservoir (1060) for future collection (1065). The vortex air will enter the bottom opening of the inner conical structure and flow upward, thus entering the bottom openings of the cold channels of the heat exchanger, and exiting the top of the heat exchanger after exchanging heat with the warm air channels within the heat exchanger. In this way, the warm air is cooled by the outgoing cool air. The cool dry air, from which water has been extracted by condensation, is used to reduce the temperature of the humid warm air, within the heat exchanger. The humid warm air is cooled to the dew point through the heat exchanger and the thermoelectric cooler, thus becoming cool dry air which is then used to lower the temperature of new humid air, forming a cycle of water condensation with enhanced energy efficiency. In some embodiments, ultraviolet LEDs (1015, 1040, 1057) can be used at different locations within the AWG, to degrade biological material, for example killing bacteria. In some embodiments, a filter (1020) can remove dust from the outgoing cool air. In some embodiments, a carbon filter, other types of filter, or mineral addition modules (to regulate taste and provide mineral nutrients) can be added at collection point (1065).

FIG. 10 illustrates a cross section of the AWG system. In some embodiments, part of the air can circulate around the device. For example, according to the design of FIGS. 5-9, the cavity may have a front side opening. In FIG. 10, the hot air moves from the front side opening of the bottom cavity (1045) to the heatsinks (1037) before being directed to the conical structures underneath. The person of ordinary skill in the art will understand that the AWG system comprises, for example, a conduit to direct the air flow from the cavity (1045) to the heatsinks (1037).

Figure 11:
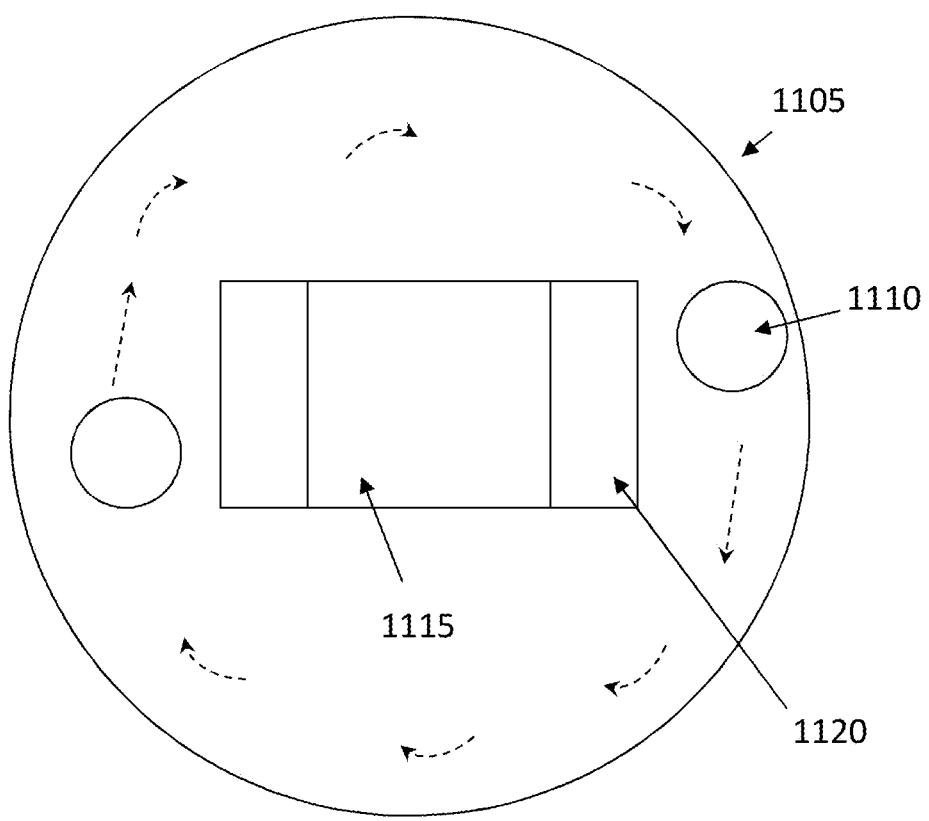

In FIG. 10, arrows (1048) indicate a plane that cuts across the AWG system in a direction normal to the sheet of FIG. 10. A schematic cross section of this plane is illustrated in FIG. 11 to visualize an exemplary air flow in some embodiments of the present disclosure. For example, the AWG system can comprise a conduit (1105) around the heat exchanger (1115) with heatsinks (1120) on two sides. These heatsinks are illustrated in FIG. 10 as well. The dashed arrows in FIG. 11 illustrate the air flow. The air is directed to enter openings (1110). Below the openings (1110), the fans illustrated in FIG. 10 as (1050) direct the air into the cyclone cone structures. In some embodiments, the conduit of FIG. 11 encloses the bottom portion of the heat exchanger only, entraining the warm air of the bottom cavity of the heat exchanger, while at the same time separating this air flowing through the cold heatsinks, from the warm air in the warm heatsinks.

The fans force the air into the conical structure in a circular pattern to generate the vortex. For example, the fan on one side will push the air in the opposite direction of the corresponding fan on the opposite side, but not along the same line. In this way, a circular rotation, and hence a vortex, is generated within the conical structure. In some embodiments, the fan can be substituted with a pump. For example, a jet pump using the previously extracted water could be more efficient and quieter than a fan, and enable the cold water to further cool the air and enhance the water extraction process. As known to the person of ordinary skill in the art, a jet pump relies on the motion of water to create a partial vacuum or otherwise generate motion into another fluid, for example inducing motion in air. In other embodiments, an impedance pump could also be used for the same purpose, or also as part of the heat exchanger core.

In some embodiments, the air flow through the AWG system is regulated by an advanced pumping system. Instead of using fans, one or two pumping systems, for example, could be used to move air through the heat exchanger and into the cyclone. An impedance pump could be integrated into the heat-exchanger micro-channels by using a material where vibrations can travel through the channel walls. As the vibrational waves travel through the walls they pump the fluid inside without the use of valves. As known to the person of ordinary skill in the art, an impedance pump relies on resonant wave interactions along a flexible media. The impedance pump relies on the vibrational excitation occurring asymmetrically with respect to the impedance of the fluid system. Therefore, the driving excitation site is selected for wave reflection and asymmetry. The impedance pump can be additively manufactured in the same way as the heat exchanger itself, and would allow for efficient pumping of air through the heat exchanger. The vibrations can be induced via a piezo electric device or other vibration sources attached to the sides of the heat exchanger.

In other embodiments, an impedance pump could be placed after the cold sink of the cooling device and pump in the same way as the fan (1050) of FIG. 10. The main advantage of an impedance pump over a fan is the robustness of the system and the reduced noise. In other embodiments, a water jet pump can be placed after the cold heatsink, instead of a fan, with the jet pump using the water in the reservoir. With a jet pump, the water would be sprayed into the air stream via a series of jets, creating air flow. This type of pump has the added advantage of recovering energy from the cold water to the air, which will further enhance the efficiency of the system.

The heat exchanger as described in the present disclosure controls the flow rate to ensure maximal efficiency for the heat exchange between cold and hot fluids. If the flow rate is too low, water production is reduced compared to the theoretical maximum, while a too high flow rate will result in a lower heat exchange efficiency. The AWGs of the present disclosure therefore comprise, in some embodiments, a control system that monitors the atmospheric humidity and temperature, and adjusts the flow rate through the device to maximize water extraction. The monitoring could be done via instruments attached to the device, probes that remotely transmit data to the device via wires or wireless communication, or by obtaining local weather data via the internet.

The control system algorithm determines the dew point for water extraction, and adjusts the air flow rate (for example by regulating the fans or the pumps) to ensure water can be efficiently extracted from the atmosphere, given the properties of the heat exchanger and the thermal capacity of the cooling system attached to the device.

In some embodiments, the flow-control system can also have the ability for a user to control the efficiency of the system to speed water extraction at the expense of efficiency or to maximize efficiency at the expense of a lower speed for water extraction. In some embodiments, the flow-control system can also have the ability to operate with dew points below freezing. This feature can be based on estimating the condensation rate, running for periods of time where ice forms on the condenser, then raising the temperature of the condenser above freezing to release the water. As an alternative to estimating the condensation rate, a flow meter could also be added to the device to determine when ice starts to form, to restrict the flow and then raise the temperature.

In some embodiments, the flow-control system can also have the ability to display to the end user the estimated water production rate, and the energy usage required to produce water at different rates. In some embodiments, the flow-control system can also have the ability to remotely monitor and control the settings of the flow control system from the internet or other communications systems. In some embodiments, the lateral dimension of the cold channels is between 1 and 200 micrometers. The lateral dimension of hot channels is adjusted accordingly, based on the cross-section ratio between 5 and 5.6.

In some embodiments, the AWG system may incorporate modules in different ways. For example, the conical structures illustrated in FIG. 10 may, in some embodiments, be implemented with different arrangements. For example, the conical structure of FIG. 3 illustrates one such alternative embodiment, where the outer conical structure comprises also a cylindrical portion, and the inner structure is not conical by cylindrical. Similarly, other shapes may be implemented, provided that the principle of operation described in the present disclosure is maintained. In some embodiments, instead of the two thermoelectric coolers illustrated in FIG. 10, one thermoelectric cooler may be used, modifying the flow of the fluid accordingly. For example, the fluid would be flowing only on one side of the AWG system. In other embodiments, multiple thermoelectric coolers may be used, for example at different locations around the heat exchanger, accounting for the conduits that connect the cavities of the heat exchanger to the coolers. In some embodiments, as illustrated in FIG. 10, the cyclone structure has a larger diameter at the top, connected to the fans after the thermoelectric coolers, compared to the diameter at the bottom. The progressively narrowing diameter of the cyclone helps induce a vortex rotation in the air, together with the motion induced by the fan or fans. In some embodiments, the inner cyclone illustrated in FIG. 10 also has a narrowing diameter, but with a different slope compared to that of the outer cyclone. In some embodiments, the two cyclones may have the same slope.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

FIG. 1 is reproduced from en.wikipedia.org/wiki/Atmospheric_water_generator, which is incorporated herein by reference in its entirety. FIG. 4 is reproduced from Ref [5].

The references in the present application, shown in the reference list below, are incorporated herein by reference in their entirety.

REFERENCES

[1] Yun et al., "Polymer Inkjet Printing: Construction of Three-Dimensional Structures at Micro-Scale by Repeated Lamination", Macromolecular Research, vol. 17, No. 3, pp 197-202 (2009)
[2] Muskin et al., "Three-Dimensional Printing Using a Photoinitiated Polymer", J. Chem. Educ. 87, 5, 512-514, 2010
[3] T. A. Schaedler, A. J. Jacobsen, A. Torrents, A. E. Sorensen, J. Lian, J. R. Greer, L. Valdevit, W. B. Carter. Ultralight Metallic Microlattices. Science, 2011; 334 (6058): 962
[4] Stevens et al. J. Exp. Boil. 61, 145, 1974
[5] Boye et al. J. of Exp. Bio. 212, 3708, 2009
[6] Stevens, DESIGN AND PHYSIOLOGY OF ARTERIES AND VEINS | The Retia, In Encyclopedia of Fish Physiology, edited by Anthony P. Farrell, Academic Press, San Diego, 2011, Pages 1119-1131
[7] A Companion to Animal Physiology" by C. Richard Taylor, 1982, Cambridge University Press, pp 224-230
[8] Sabry et al. IEEE Trans. On Comp. and Pack. Tech., vol. 23, 3, 562, 2000
[9] Herrmann et. al., Conformal hydrophobic coatings prepared using atomic layer deposition seed layers and non-chlorinated hydrophobic precursors, J. Micromech. Microeng. 15 984, 2005

What is claimed is:

1. A structure comprising:
a counter flowing heat exchanger comprising a plurality of cold channels and a plurality of hot channels, wherein the plurality of cold channels is configured to carry a fluid flow in a first direction at a first temperature, and the plurality of hot channels is configured to carry the fluid flow in a second direction opposite the first direction, and at a second temperature higher than the first temperature;
a cooler connected to the plurality of hot channels of the counter flowing heat exchanger and configured to cool the fluid; and
a cyclone structure connected to the cooler and configured to:
generate a vortex in the fluid,
condense water within the fluid onto surfaces of the cyclone structure,
direct the fluid to the plurality of cold channels of the counter flowing heat exchanger, and
collect condensed water in a reservoir,
wherein
the counter flowing heat exchanger comprises a first section, a second section, and a third section, the second section being between the first section and the third section,
the plurality of cold channels extends along an entire length of the first, second and third sections, opening at one end of the first section and at one end of the third section,
the plurality of hot channels extends along an entire length of the second section, opening at both, opposite ends of the second section,
within the second section, each cold channel of the plurality of cold channels is surrounded by hot channels of the plurality of hot channels,
the cooler is connected to openings of the plurality of hot channels at the third section, and
a cross section of the plurality of hot channels is greater than a cross section of the plurality of cold channels.

2. The structure of claim 1, wherein the surfaces of the cyclone structure are hydrophobic.

3. The structure of claim 2, wherein the surfaces of the cyclone structure are patterned to increase thir the surfaces' hydrophobicity.

4. The structure of claim 1, wherein each channel of the plurality of cold channels has a diamond shape and each channel of the plurality of hot channels has an octagonal shape.

5. The structure of claim 1, wherein the plurality of cold channels and the plurality of hot channels have an hexagonal shape.

6. The structure of claim 1, wherein a ratio between the cross section of the plurality of hot channels and the cross section of the plurality of cold channels is between 5 and 5.6.

7. The structure of claim 1, wherein a lateral dimension of each cold channel of the plurality of cold channels is between 1 and 200 micrometers.

8. The structure of claim 1, wherein the cooler comprises a thermoelectric cooler, a hot heatsink on an external side of the thermoelectric cooler, at least one fan configured to cool the hot heatsink, and a cold heatsink on an internal side of the thermoelectric cooler, the cold heatsink configured to allow flow of the fluid while cooling the fluid.

9. The structure of claim 1, wherein the cyclone structure further comprises at least one fan configured to generate the vortex.

10. The structure of claim 1, wherein the cyclone structure further comprises an inner cyclone configured to direct the fluid to openings of the cold channels at the third section.

11. The structure of claim 1, wherein the cooler comprises a passive heat sink.

12. The structure of claim 8, wherein the cooler further comprises a passive heat sink.

13. The structure of claim 1, wherein a ratio between the cross section of the plurality of hot channels and the cross section of the plurality of cold channels is 5.3.

14. The structure of claim 1, further comprising a conduit connecting the cooler to the plurality of hot channels at the third section counter flowing heat exchanger, wherein the conduit has a circular shape and is configured to circulate the fluid in a circular pattern around the third section of the counter flowing heat exchanger.

15. The structure of claim 1, wherein the cooler comprises:
   a plurality of thermoelectric coolers;
   a plurality of hot heatsinks, each hot heatsink on an external side of each thermoelectric cooler;
   a plurality of fans configured to cool the plurality of hot heatsinks; and
   a plurality of cold heatsinks, each cold heatsink on an internal side of each thermoelectric cooler, the plurality of cold heatsinks configured to allow flow of the fluid while cooling the fluid.

16. The structure of claim 1, wherein the cyclone structure has a progressively narrowing diameter configured to generate the vortex.

* * * * *